May 12, 1970  A. E. MOORE  3,510,893
LIGHT-WEIGHT TUBULAR STRUCTURE
Filed Aug. 28, 1967
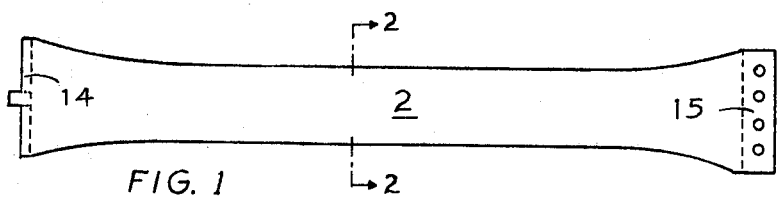
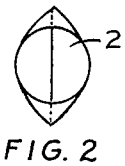
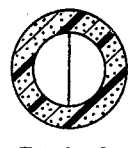
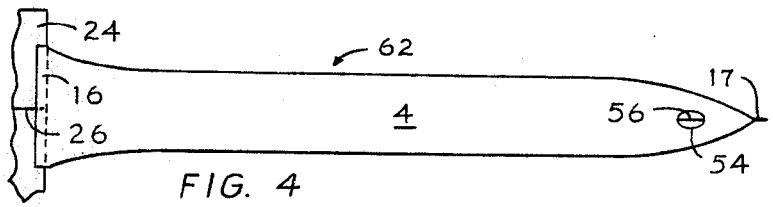
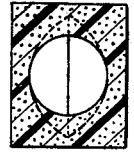
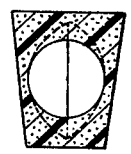
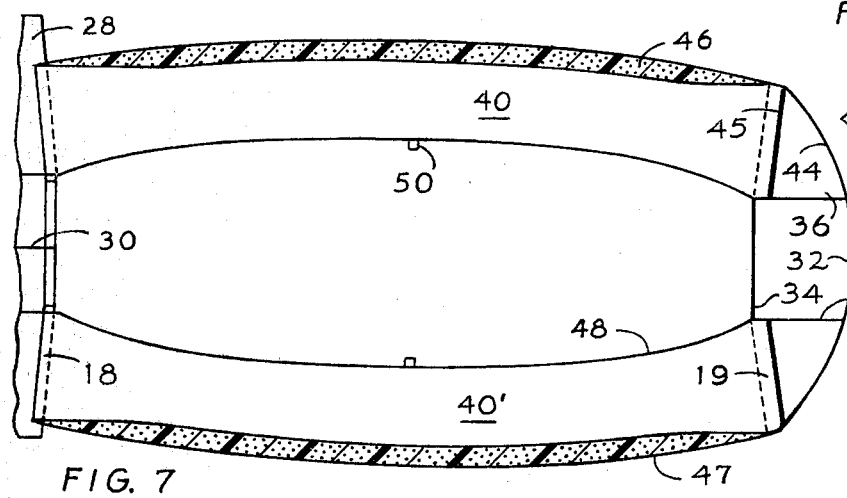
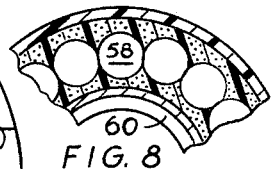
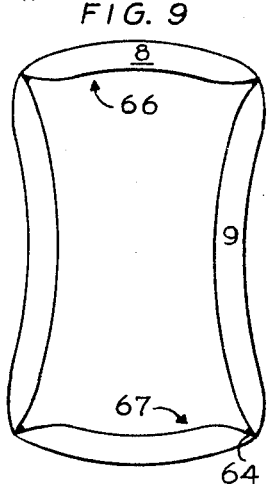
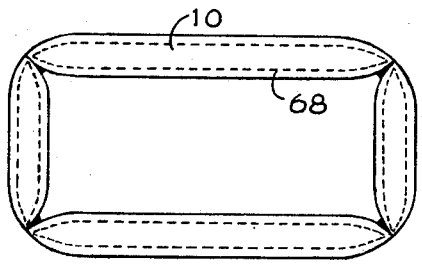
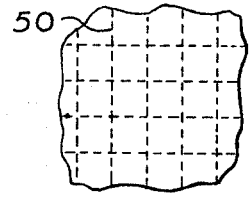
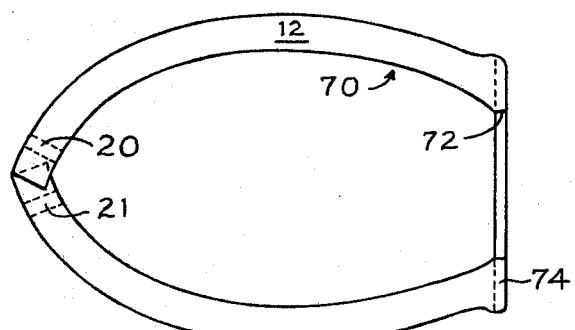
Alvin Edward Moore
INVENTOR.
BY Alvin E. Moore
ATTORNEY

United States Patent Office 3,510,893
Patented May 12, 1970

3,510,893
LIGHT-WEIGHT TUBULAR STRUCTURE
Alvin Edward Moore, 916 Beach Blvd.,
Waveland, Miss. 39576
Filed Aug. 28, 1967, Ser. No. 663,888
Int. Cl. B63c 9/04; B63d 37/00
U.S. Cl. 9—11
31 Claims

ABSTRACT OF THE DISCLOSURE

An inflated, light-weight device, serving either as a useful article of manufacture and commerce or a structural element of composite objects. Basically, it comprises: a tube having a round middle part; preferably two tapered end parts, each being wider than the middle part and tapering to flatted-together and bonded end portions; and closable means to supply gas (preferably helium) to its sealed space. This tubular element preferably is surrounded by foam plastic, which may form the periphery of a structural element, or may be more extensive, around assembled tubes and within a skin. The invention also comprises skin material of plastic-impregnated network; and methods of making the tube.

---

This invention pertains to an elongated, light-weight tubular structure which may be used in aircraft, boats, cars, swim sleds, surfboards, in furniture that is aboard conveyances or often moved about, in toys, skis, light-weight electric cables (for example, buoyant cables), or other vehicles, in a barrel or other container, a life buoy or life-saving raft, a floating oil-well-drilling rig, house construction, or in various other capacities. There is a great need for such a light-weight device, especially when it is adapted to serve as a strength-providing, crash-proof part of a vehicle.

In view of these facts, an object of this invention is to provide an inflatable, sealed tubular element of metal or other dense material that is substantially non-extensible under an inflation pressure above that of the atmosphere and substantially impermeable to gas, having a straight or curved longitudinal axis, said element being adapted: to be flattened throughout its length, without wrinkling damage to its material, into two rectilinear wall portions; to have the flattened ends of its gas-containing space sealed; and to be inflated, then forming a round middle part and wider, flaring, tapered end portions that terminate in flatted ends.

Another object is to form such a tubular element of metal, including means permanently sealing its hollow tube and gas inlet after inflation with material that is impermeable to gas.

Another objective is to provide a tubular structure comprising an inflated tube and foam plastic that surrounds the tube.

Another purpose is to provide a tubular element of the above type that has thin but strong wall materials and inflating gas that has a pressure well above that of the atmosphere, and thus forms a strong article or a strength-providing element of a vehicle, barrel, container or the like.

A further purpose is to provide a strong, lightweight, load-carrying barrel, life-saving device, vehicle body, or other container that comprises wall tubes of the above type.

A further objective is to provide a skin (thin-wall) material that is strong and preferably flexible—usable for example in the walls of inflated tubes or to form the exterior skin around an assembly of tubes—comprising a light but strong network and plastic that impregnates and coats the mesh.

Another purpose is to devise methods of manufacture of an inflatable tubular element of the above type comprising: the extrusion of an open-ended tube; flattening at least one of its end portions; bonding at least part of each flattened end portion, and sealing the gas-containing space of the tube; inflating it; and permanently sealing its gas inlet.

The foregoing and other objects will become more fully apparent from the following detailed description of several forms of the invention, and from the accompanying drawings, in which:

FIG. 1 is an elevational view of one form of the inflated tube of the invention.

FIG. 2 is a view in section of the tube from the plane 2—2 of FIG. 1.

FIG. 3 is a sectional view, from a plane comparable to the plane 2—2 of FIG. 1, of a composite article or structural element comprising the straight-axis tube of FIG. 1 (or FIG. 4) and a circular jacket of plastic around the tube.

FIG. 4 is a side elevational view, partly broken away, of a toy balloon, missile, rocket or other article, comprising a modified form of the type of tube shown in FIG. 1, and flight-stabilizing fins at its stern.

FIG. 5 is a sectional view similar to FIG. 3, but showing a structure that is rectangular in cross section.

FIG. 6 is a sectional view similar to FIGS. 3 and 5, but showing a structure that is quadrilateral in cross section and has tapering sides that are in radial planes having a common center line.

FIG. 7 is a sectional view, partly broken away, of the main body of a vehicle, from a vertical plane through its longitudinal axis.

FIG. 8 is a sectional view, partly broken away, of a barrel or other container from a plane, thru the middle parts of assembled tubes of the above type, that is normal to the container's longitudinal axis.

FIG. 9 is a detail, elevational view of an assembly of two longitudinally curved forms of the invented tube.

FIG. 10 is a top plan view of a life-saving device or the like that comprises tubes of this invention.

FIG. 11 is a detail plan view, partly broken away, of a material for the outer skin and-or tubular walls of a vehicle, container, or the like.

FIG. 12 is a detail view (in elevation or plan), illustrating an optional way of fastening together the ends of tubes of the invention.

The inflated tubular elements shown in FIGS. 1, 2, 4 and 10 have straight longitudinal axes, and those of FIGS. 7, 9 and 12, have longitudinal axes that are curved. Each of these tubes has a middle portion (2 in FIGS. 1 and 2, 4 in FIG. 4, 6 in FIG. 7, 8 and 9 in FIG. 9, 10 in FIG. 10, 12 in FIG. 12) that in cross section is round, and in many instances is circular. But when the tubes are straight, or curved and short and radially arranged around the longitudinal axis of a container, vehicle cabin or the like, they optionally may be jammed together within a hoop or other band, and thus have somewhat flattened middle portions. In barrel-curved objects these flattened portions make contact of the tubular walls possible throughout the full length of the inflated parts of the flexible, curved-axis tubes; and these closely juxtaposed tubes may be glued together, adding strength to the banded assembly.

Optionally, one of the tube's end parts may be round-ended; but preferably and as shown, each tube has a pair of tapered and flattened end parts, comprising sealed portions (14 and 15 in FIG. 1, 16 and 17 in FIG. 4, 18 and 19 in FIG. 7, 20 and 21 in FIG. 12). These edge portions are sealed with a bonding material—for example, solder, welding or epoxy-resin cement—and optionally they also may be riveted or bolted if the holes for this extra fastening means are positioned well clear of the gas-containing space. These sealed portions may consist of the whole of the flatted tubular ends, or (in any of the forms of FIGS. 1, 4, 7 and 12, and as clearly indicated in FIGS. 4, 7 and 12) they may be spaced from the extreme end of a flatted part, leaving a temporarily unsealed bifurcated portion of the end. In assembly of the tubes in a composite article the forks of this bifurcated portion may be slightly sprung or bent over, and welded, soldered or cemented to an object that is to be attached to the tubes. Such an object, for example, may be: the head or bottom of a barrel or other container, vertical and horizontal stabilizing fins of an aircraft or other vehicle, such as elements 24 and 26 of FIG. 4 and 28 and 30 of FIG. 7; or the frame of a forward or bow portion of a vehicle, such as the one of FIG. 7.

In this figure the streamlined vehicular nose comprises a pair of separated plexiglass windows or windowed doors, 32 and 34, and a metallic frame which includes radial flanges, 36, equal to the number of the inflated tubes 40 and 40′, the radial planes of which are centered at the longitudinal axis of the vehicle. These flanges are of strong material, for example metal, which may be steel and preferably is spring steel, or of spring-steel mesh, coated and impregnated with plastic. The strength of their material is supplemented by that of the attached thin-walled cylinder 42 of the nose frame (to which the windowed elements are fastened) and the arched, disk-like element 44, which is fixed to the cylinder and to the forward, curved edges of the radial flanges. Preferably the nose frame also comprises a second disk-shaped element at 45. These nose-frame elements are of strong material, and may be of the same material as that of the radial flanges. They are securely bonded to the flanges and to each other with welds, solder, or strong cement; and, with the provision of narrow contacting flanges at their contacting edges, they also may be riveted or bolted together. Optionally, the plurality of spaces within the nose-frame elements may be filled with pressurized gas, which may be air but preferably is helium.

The foam plastic, 46, which fills the spaces above and on the upper side parts of the tubes, as well as the foam plastic that borders any of the other tubes of this invention, preferably is of the type that has a multiplicity of minute, closed and sealed gas cells. By known methods this type of plastic, for example polyurethane foam, may be made rigid or with various degrees of flexibility. The type that is preferred in this invention is slightly (stiffly) flexible.

The plastic 46 optionally also may extend radially inward of the tubes proper (in the fashion of FIG. 6). But preferably it does not interfere with contact between the side walls of tubes 40; and preferably these side walls are jammed together within thin-steel hoops or bands over the middle parts of the tubes; and these somewhat flattened side walls, as explained above, are preferably soldered, welded or glued throughout the lengths of the middle parts. Thereafter the liquid materials of foam plastic preferably are inserted into the sealed spaces between an outer skin, 47, that is circular in cross section normal to the cabin's axis and an inner skin or barrel, 48, that is similarly circular in section.

Both of these wall elements are arched in every direction (that is, barrel-curved), and thus add strength to the cabin against outside shocks. Their material—as well as that of any other skin or thin wall of the articles and tubes of this invention—optionally and as illustrated in FIG. 11, may comprise a strong fabric, 50, of interconnected wire or fibrous filaments, and plastic that preferably is stiffly flexible, impregnating and coating the fabric. This network, at least when it is used in the outer skin or the thin walls of the tubes, preferably comprises a wire mesh of spring steel.

The tubes 40 and 40′, like those of any of the other figures, are inflated with air or other gas, preferably helium, at a pressure that may be either slightly above or well above that of the atmosphere. The lower tubular elements 40′, which are subject to more and often harder shocks than are the upper tubes, preferably are inflated at the higher pressures—for example in the range of 15 to 70 pounds per square inch; and preferably—especially when the barrel-curved structure 48 is of fairly thick material (for example of staves)—the upper tubes 40 are of thinner and lighter materials than tubes 40′, and are inflated at only a few pounds per square inch. Optionally, the top few of these upper tubes, when lighter than air, may be of a little larger volume than the tubes 40′, to aid in centering the aerostatic force on the vehicle above its center of gravity. But preferably the internal space of the inner, barrel-like structure 48 has sufficient vertical extension to make feasible the preferred method of unbalancing this lift—namely by placing balloons in the top of this space, so that they exert a force upward against the lower surfaces of tubes 40. Another aid in securing this type of stability is the location of heavier parts of the load well down on and within the lower deck or floor of 48, which is not shown in FIG. 7 but in practice is utilized.

The tubular elements of FIG. 7, like those of the other figures, may be repeatedly inflatable, in which case valves 50 are spring-closed. But when the tube-wall materials are dense and substantially impermeable to gas, or when the tubular elements are of gas-permeable materials (for example, rubber) and are surrounded with closed-cell foam plastic except at their contacting side walls, the gas is preferably permanently sealed in the tubes, and the valves or inlet openings or inflation tubes are permanently closed. When these gas inlets are thus fixedly sealed they preferably comprise short tubes of the type shown in FIG. 4 at 54, and after the inflation through them their ends are flatted and bonded together with solder, welds or strong cement, as indicated at 56.

When element 48 is of the somewhat flexible skin material of FIG. 11 all the tubes 40 and 40′ optionally may be very strong and inflated well above atmospheric pressure; and in this event the cabin, comprising the tubes, foam plastic and skins, is similar to and has strength like that of a barrel.

Various other containers may be made in the fashion of the vehicular load-carrying container or cabin of FIG. 7. For example, these may be barrels, casks, life-saving boats or rafts that house survivors of wrecks, or barrel-curved or cylindrical receptacles of any type.

FIG. 8 illustrates a cylindrical container. Its inflated tubes 58 as shown have a straight longitudinal axis. In practice, these tubes are preferably jammed together within metal hoops and they are closed at the bottom end of the container by a planar disk and (as is optional also concerning disk-like element 45 of FIG. 7) this planar disk has narrow, radial flanges securely fixed to its inner side, and these flanges are straddled by and bonded with bifurcated flatted ends of the tubes. The top of the container preferably comprises a flanged, apertured disk-like element or ring that is secured to bifurcated tube ends by narrow flanges and bonding (welding, solder or cement), in the above manner. This upper frame element, part of which is shown in FIG. 8 at 60, is a ring that has a large internal diameter; and in its aperture the container cover may be fastened or sealed, and hinged or removable.

A barrel-curved structure also may be made in the general manner indicated in FIG. 8. In this event, the inflated tubes 58 are curved and similar to tubes 40 and 40′. When curved tubes are thus used (in structure indicated in either of FIGS. 7 and 8) they optionally may be assembled in a barrel-like object in any of three general ways: (1) by jamming their middle parts together, thus securing continual contact between their inflated, somewhat flattened sides, as above explained—with the central portions of these side walls being flattened more than the end portions of the said middle parts; (2) the container may be designed to be sufficiently short relative to the diameter of its tubular elements to cause only the centers of these elements to be circular or nearly circular in cross section (that is, each of the tubes is mainly or wholly made up of the tapered end parts, which taper to the flatted and sealed end portions); and therefore glued or soldered contact between the tubular side walls may be obtained between the flattened and sealed ends; or (3) the flattened end parts may be hoop-jammed together in short, endwise areas of contact, and the middle portions arch on upward toward their centers, with spaces between them (filled with plastic) that are increasingly wide toward these centers, and strong fabric (preferably of spring-metal mesh) is securely fixed to the radially outer parts of the tubes before it is impregnated and coated with dense plastic.

FIG. 5 illustrates an element that comprises a straight-axis inflated tube which preferably is of metal and strongly inflated when much strength of the element is required. This type of tubular structure, quadrilateral in all of its cross sections, bondable with other tubes along its side walls may be used in many locations—for example as a beam, wall or roof element in house or other civil-engineering construction or in vehicles, ladders, swim sleds or (when its horizontal extent is greater than that shown in FIG. 5 and comprises several of the tubes in integral foam plastic) in surf boards. It may, for instance, be extensively used by contractors or such activities as the Seabees of the U.S. Navy. Optionally, this element of FIG. 5 may be sheathed in skin material of the above described type.

FIG. 4 shows the invented tubular element as embodied in a toy flying object or other missile. This device has arrow-like stabilizing fins, 24 and 26; and optionally these may be encircled by and fixed to an outer ring which supports rocket or jet motors; or such motors may be fastened in the radially inner parts of the fins—in the angles between the fins. Preferably, the tube 62 is inflated with helium, or other lighter-than-air gas.

FIG. 9 illustrates a set of four tubes, welded or soldered or cemented together at 64. A group of joined tubes may be used in various ways. For example, this set may be arranged with four other similar sets of tubes in fore-and-aft, streamlined manner around a vehicular cabin of the type shown in FIG. 7. In this event, the upper tubes (of which tube 66 is one) are within a fluid-dynamic skin of the above-described type, are well clear of the cabin's upper surface, and serve as an upper, lift-providing fluidfoil; and the similar lower group of skin and tubular elements of varying diameters (of which tube 67 is one) is well clear of the cabin's lower surface and serves as a lower fluidfoil.

In FIG. 10, a lifeboat or lift raft is shown. Although such a vehicle may have a narrower or even pointed bow, it preferably is largely quadrilateral, as viewed from the top in FIG. 10; and therefore it may be economically stacked with other, similar boats on a ship or an aircraft. Preferably the tubes are of metal and permanently inflated with helium and, as indicated at 68, the vertically stacked side and end tubes are successively of smaller diameter from top to bottom. This arrangement aids in centering the aerostatic lift of the device above its center of gravity. A skin of fabric and plastic of the above-described type, or of thin metal, completely sheathes the exterior of the boat and is extended across the space between its bottom tubes to form a deck on which the survivor may sit, lie or stand. On top of this deck a carpet of foam plastic may be glued. Preferably a second fabric-and-plastic skin is fixed to inner surfaces of the tubes, lining the interior of the boat.

FIG. 12 illustrates another way in which the invented tubes may be assembled. Each pair of the tubes 70 have bifurcated ends that are joined into a point at 20 and 21, as above described; and at their other end parts such bifurcated ends straddle and are bonded to narrow flanges 72 on a ring or polygonal frame element 74. In this element plexiglass door or other closure element may be mounted.

The tubes of this invention may be made in various ways. When their walls comprise reinforced or plain plastic, for example, they may be made by: forming an open-ended tube in a mold and around a removable core, said tube having at one of its ends short, narrow, diametrically-positioned and projections or flanges, for a gas-inlet tube; removing the tube and flattening at least its end parts until the side edges of the said end projections and portions of the end parts come together (said edges and portions being coated with epoxy-resin glue); clamping these side edges and portions together until the glue sets; removing the flattened-end tube from the clamping means; inflating the tubular element through the gas-inlet tube that has been formed from the said end projections; and permanently sealing the hollow space in the tubular element by flattening and cementing together the extreme end portions of the gas-inlet tube. Alternatively, the tubular elements may be made of fabric-reinforced plastic bp the following method: glueing and sewing together edges of largely rectangular pieces of balloon cloth or the like (for example, of nylon) to form flattened tubes of circular cross section, each having at one end a small, open, gas-inlet tube; inflating each tube with the desired type of preferably non-inflammable gas at the final desired pressure, then flatting and sealing with strong cement the extreme end of its gas-inlet tube; placing the inflated fabric tube in a hinged, two-part mold; pouring plastic in the mold, around the inflated fabric element as a core, allowing the plastic to set or cure; and hinging open the mold and removing the completed tubular element.

When the tubular elements are of metal they may be made by casting. But preferably as a first step an open-ended, metallic tube is formed by hot or cold pressing or as an extrusion. When it is made by pressing, end projections for forming a small gas-inlet tube of the above type optionally may be made at the same time that the two halves of the main tube are formed; or alternatively (in either the pressing or extruding method) a valve like a common automobile-tire valve may be inserted and glued, soldered or welded in a hole in the tube's wall. The tube formed by pressing is completed by soldering, welding or cementing together the edges of the pressed halves (and, except for its gas-inlet opening, the edges of the inlet tube, if any), inflating the tubular element, and flatting and sealing the end edges (if any) of the optional gas-inlet tube.

Currently, the preferred way of making the metallic inflated tube of the invention comprises the following steps: extruding metal into a thin-walled, open-ended tube; cutting one end of the tube to form short, narrow, diametrically-spaced projections for the side walls of a gas-inlet tube; flattening at least the end parts of the tube and bringing the side edges of the said side walls together, with the inlet tube's walls being held in curved shape by a short, thin-walled, stiffly yieldable cylinder; bonding together flatted portions of the said end parts with solder, welding or epoxy-resin cement; inflating the tubular element with a chosen non-inflammable gas (preferably helium); flatting the extreme ends of the gas-inlet tube together, and sealing these ends with solder, welding or strong cement.

Various modifications of the structure may be made within the scope of the following claims. In these claims the word "plastic" signifies any type of natural or synthetic plastic, including rubber; the word "gas" means any pure gas or gaseous mixture; "network" signifies fabric of any size of mesh; the term "tube" or "tubular element" is used to mean a hollow article that is circular or non-circular in cross section; "skin material" to signify thin exterior or interior material of an object (for example, of a tube or of the outer skin around an assembly of tubes); and "container" to mean any object (for example, a barrel or vehicular cabin) having a hollow space and containing other objects or matter.

I claim:
1. A light-weight inflated tubular structure comprising: an hermetically sealable, elongated tube, having wall material that is slightly permeable to gas, and having: a middle part comprising curved walls of a radius of curvature that is the same on each side of a plane through the longitudinal axis of said structure; and at least one flattened-end part having a dimension across and normal to said axis that is larger than any dimension of said middle part that is across and normal to that axis, said flattened-end part comprising flattened-together wall portions of said tube and means bonding said wall portions together; gas at a pressure above that of the atmosphere within and permanently inflating said tube; and foam plastic, having closed gas cells, surrounding said tube, permanently preventing appreciable escape of said gas.

2. Structure as set forth in claim 1, in which said wall material comprises rubber.

3. Structure as set forth in claim 1, having apertured means on said tube, for aid in its inflation and sealing, comprising a relatively small tube that has an end having flattened-together edges and means bonding said edges together.

4. Structure as set forth in claim 1, in which a portion of said middle part of the tube is of substantially circular cross-section in a plane normal to said axis, and in which the portion of said middle part between said circular portion and each of said flattened ends is arcuately tapered from the end to said middle portion.

5. Structure as set forth in claim 1, in which at least the major portion of said middle part of the tube has a perimeter that is curved in planes through the said axis.

6. Structure as set forth in claim 1, in which said gas is lighter than air.

7. A device comprising the structure set forth in claim 1, which further comprises: at least one other elongated tube, alongside the tube set forth in claim 1, said foam plastic surrounding said tubes.

8. A light-weight tubular article, comprising a sealed, inflated, elongated tube, apertured for inflation, with a longitudinal axis, having:
curved wall structure of thin dense material that is substantially non-extensible when under inflation, having opposite, end-edge portions;
means sealingly holding flattened surfaces of each of said end-edge portions together in strong junction, forming flattened tube-end parts, each of which is wider than an adjacent portion of the tube's middle part;
said curved wall structure having curved hollow space that in all cross sections along planes substantially normal to said axis has an approximately equal area on each side of said axis, whereby the shape of said article may be changed without efficiency-destroying wrinkling of said material by inflation of the tube from flatness throughout its length into said curved, hollow-space-containing wall structure;
means for sealing said aperture after inflation of said tube; and
non-aerial gas under pressure above that of the atmosphere permanently sealed in said hollow space.

9. An article as set forth in claim 8, in which said dense material comprises metal.

10. An article as set forth in claim 8, in which said dense material comprises fabric and plastic impregnating and coating said fabric.

11. An article as set forth in claim 10, in which said fabric is wire mesh.

12. An article as set forth in claim 10, in which said fabric is spring-steel mesh.

13. An article as set forth in claim 8, in which said gas is lighter-than-air.

14. An article as set forth in claim 8, in which said gas is helium.

15. An article as set forth in claim 8, in which the means for sealing said aperture permanently closes the aperture after said inflation.

16. An article as set forth in claim 8, further comprising foamed plastic, having closed gas cells, surrounding said tube.

17. An article as set forth in claim 8, in which said means sealingly holding said end-edge portions together comprises bonding material that is sufficiently spaced from at least one end-edge of said tube to form a flat tube-end attachment element, of sufficient extent along said axis to serve as means for attachment of the tube to another object.

18. An article as set forth in claim 8, in which said means sealingly holding said end-edge portions together comprises bonding material, between adjoining faces of said tube-end parts, that is spaced from the end-edges of at least one pair of the said parts, with the said pair thus comprising forked tube-end elements facing each other and capable of being moved from each other in attachment of said article to another object.

19. An article as set forth in claim 8, in which: said longitudinal axis is an arc; an arcuately curved surface that includes said arc intersects the plane of said flattened tube-end parts and is normal to said plane at the intersection; and the radius of the said arc and surface is sufficiently large to insure that the volume of said curved hollow space which is radially outward from said arcuately curved surface is nearly enough equal to the volume of the space that is radially inward of the curved surface to insure that the said wrinkling does not destroy sealing and strength-providing efficiency of the inflated tube.

20. A light-weight, curved wall container having a longitudinal axis, comprising:
curved flexible skin means surrounding at least a major portion of a load-containing space;
between said skin means and space, and inclosing at least a major portion of the space, a strength-providing container framework comprising a plurality of inflated, elongated tubular elements having longitudinal axes, each of said tubes comprising: curved, dense wall material that is substantially non-extensible when subject to a pressure of inflation above that of the atmosphere; tube-end edge portions; means sealingly holding flattened surfaces of each of said tube-end portions in strong junction, forming strength-providing, flattened tube-end attachment parts at the ends of the tube, each of which is wider than an adjacent portion of the tube's middle part; and gas under pressure greater than that of the atmosphere in said tube;
container-end elements, closing opposite ends of said space, attached to said skin;
means strongly connecting said container-end elements to said attachment parts; and
integral, strength-providing insulating material, comprising hollow cells, between said framework and skin means.

21. A container as set forth in claim 20, in which said insulating material comprises foamed plastic.

22. A container as set forth in claim 20, in which each of said longitudinal axes of the tubes is curved.

23. A container as set forth in claim 20, in which each of said longitudinal axes is curved and lies in a plane that includes the longitudinal axis of the container.

24. A container as set forth in claim 20, in which said longitudinal axes are curved in arcs of substantially equal curvature and said arcs are arranged to lie in a curved surface that is coaxial with a curved surface of said curved skin means.

25. A container as set forth in claim 20, in which said gas is lighter than air.

26. Structure as set forth in claim 20, in which said container is a vehicular load-carrying body.

27. Structure as set forth in claim 26, in which at least one of said container-end elements comprises a windowed element.

28. A container as set forth in claim 20, in which said insulating material also extends inside said framework, surrounding at least the inflated portions of said flat-ended tubes.

29. Structure as set forth in claim 20, comprising a life-saving device, in which: at least the majority of said tubes are inflated with lighter-than-air gas; some of said tubes are placed higher than others in the device; and the major portion of the total volume of said lighter-than-air gas is above the center of gravity of said device.

30. Structure as set forth in claim 29, in which said skin means and tubes are constructed and arranged to form said container in the shape of a barrel, curved both in fore-and-aft planes that include said longitudinal axis and in planes that are normal to said axis.

31. A light-weight tubular article, comprising a sealed, inflated, elongated tube, apertured for inflation, with a longitudinal axis, having: curved wall structure of thin dense material that is substantially non-extensible when under inflation, having opposite, end-edge portions; means sealingly holding flattened surfaces of each of said end-edge portions together in strong junction, forming flattened tube-end parts, each of which is wider than an adjacent portion of the tube's middle part; said curved wall structure having curved hollow space that in all cross sections along planes substantially normal to said axis has an approximately equal area on each side of said axis, whereby the shape of said article may be changed without efficiency-destroying wrinkling of said material by inflation of the tube from flatness throughout its length into said curved, hollow-space-containing wall structure; means for sealing said aperture; and gas under pressure above that of the atmosphere permanently sealed in said hollow space.

References Cited

UNITED STATES PATENTS

| | | | |
|---|---|---|---|
| 1,667,002 | 4/1928 | Hall. | |
| 2,584,884 | 2/1952 | Kirby | 9—11 |
| 2,718,983 | 9/1955 | Deskey | 222—92 |
| 3,297,461 | 1/1967 | Siddall | 117—4 |
| 1,690,654 | 11/1928 | Trotter | 220—1 |

FOREIGN PATENTS

| | | |
|---|---|---|
| 1,380,674 | 10/1964 | France. |

MILTON BUCHLER, Primary Examiner

J. L. FORMAN, Assistant Examiner

U.S. Cl. X.R.

222—92